United States Patent
Wei et al.

(10) Patent No.: US 8,001,588 B2
(45) Date of Patent: Aug. 16, 2011

(54) SECURE SINGLE SIGN-ON AUTHENTICATION BETWEEN WSRP CONSUMERS AND PRODUCERS

(75) Inventors: Yang Wei, Hayward, CA (US); Richard H. Frost, Lathrop, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1026 days.

(21) Appl. No.: 11/638,339

(22) Filed: Dec. 12, 2006

(65) Prior Publication Data

US 2008/0141028 A1 Jun. 12, 2008

(51) Int. Cl.
*H04L 9/32* (2006.01)
(52) U.S. Cl. ............... 726/8; 726/10; 713/176; 709/229
(58) Field of Classification Search ............... 726/8, 10, 726/5, 3; 713/176, 168, 175, 180; 709/219, 709/225, 229; 707/1, 9, 10, 781, 783, 784
See application file for complete search history.

(56) References Cited

U.S. PATENT DOCUMENTS

| | | | |
|---|---|---|---|
| 7,069,440 B2 * | 6/2006 | Aull | 713/175 |
| 7,137,006 B1 * | 11/2006 | Grandcolas et al. | 713/180 |
| 7,346,923 B2 * | 3/2008 | Atkins et al. | 726/6 |
| 7,395,243 B1 * | 7/2008 | Zielke et al. | 705/40 |
| 7,526,537 B2 * | 4/2009 | Breeden et al. | 709/220 |
| 7,698,398 B1 * | 4/2010 | Lai | 709/223 |
| 2005/0256808 A1 * | 11/2005 | Allamaraju et al. | 705/67 |

FOREIGN PATENT DOCUMENTS

EP 1089516 A2 * 4/2001

OTHER PUBLICATIONS

Atkinson, Bob et al. "Specification: Web Services Security (WS-Security) Version 1.0", Apr. 5, 2002. International Business Machines Corporation, Microsoft Corporation, Verisign, Inc. 35 pgs.*

* cited by examiner

*Primary Examiner* — Zachary A Davis
(74) *Attorney, Agent, or Firm* — Park, Vaughn, Fleming & Dowler LLP; Shun Yao

(57) ABSTRACT

One embodiment of the present invention provides a system that facilitates secure single sign-on (SSO) authentication for web-services communications. During operation, the system receives a Web Services for Remote Portlet (WSRP) request from a WSRP consumer and also receives a digital signature associated with the WSRP request. The system then validates the digital signature and authenticates a user based on the validation, thereby allowing the user to sign on without providing a password.

24 Claims, 7 Drawing Sheets

SECURE SINGLE SIGN-ON AUTHENTICATION BETWEEN WSRP CONSUMERS AND PRODUCERS

BACKGROUND

1. Field of the Invention

The present invention relates to secure network communications. More specifically, the present invention relates to a method and system for facilitating single sign-on authentication between a Web Services for Remote Portlet (WSRP) consumer and a WSRP producer.

2. Related Art

Over decades, software architectures have been constantly evolving to deal with increasing levels of software complexity. With the Internet creating new dimensions in computational complexity, traditional architectures seem to be reaching their limits in scalability, portability, and interoperability. Meanwhile, the consumers' needs for information are becoming progressively more sophisticated and demanding.

Distributed, platform-independent programming, which takes advantage of a myriad of connectivity products, is an answer to this paradigm shift. Particularly, the Service Oriented Architecture (SOA) is expected to be the next evolutionary wave in software architecture to meet these more complex challenges. Based on SOA, the Organization for the Advancement of Structured Information Standards (OASIS) has produced Web Services for Remote Portlets (WSRP), a set of specifications that allow web portals to embed remotely-running portlets inside their web pages without requiring any additional programming by the portal developers.

One essential feature of WSRP portlets is single sign-on (SSO). SSO is a mechanism whereby a single authentication of a user can permit the user to access a set of systems which the user is authorized to access without the need to enter multiple passwords.

WSRP web services involve communications between a service consumer (WSRP consumer) and a service producer (WSRP producer), typically in the form of Simple Object Access Protocol (SOAP) messages. The security of these messages is important, because a WSRP portlet can potentially transmit sensitive information, such as financial or personal identity data. To ensure secure communication, the WSRP SSO feature generally requires a user to provide both a username and a password.

However, this approach can be impractical. For instance, a WSRP consumer and producer can reside in different organizations and different systems, and hence the user profiles at the consumer system and producer system are often unsynchronized. Furthermore, most of WSRP consumers use directory services, such as Lightweight Directory Access Protocol (LDAP) services, for user management, and user passwords are unavailable with such directory services. Therefore, secure WSRP SSO can be difficult or impractical to implement for existing applications.

Hence, what is needed is a method and system that facilitate secure SSO for WSRP applications without requiring a user to submit a password.

SUMMARY

One embodiment of the present invention provides a system that facilitates secure single sign-on (SSO) authentication for web-services communications. During operation, the system receives a Web Services for Remote Portlet (WSRP) request from a WSRP consumer and also receives a digital signature associated with the WSRP request. The system then validates the digital signature and authenticates a user based on the validation, thereby allowing the user to sign on without providing a password.

In a variation of this embodiment, the system receives a Simple Object Access Protocol (SOAP) message. Furthermore, the digital signature is associated with a Web Services Security (WSS) header of the SOAP message.

In a variation of this embodiment, the digital signature is produced by the WSRP consumer using a private key. The system further validates the digital signature using a public key corresponding to the private key of the WSRP consumer.

In a variation of this embodiment, the WSRP request is encrypted and the system decrypts the WSRP request.

In a variation of this embodiment, the system generates a local security token based on the authentication of the user, thereby facilitating access to secure local services for the authenticated user.

In a variation of this embodiment, the system authenticates the WSRP consumer prior to validating the digital signature.

One embodiment of the present invention provides a system that facilitates SSO authentication for web-services communications. During operation, the system receives a user identifier (UID) and generates a WSRP request corresponding to the UID. The system further generates a digital signature associated with a header for the WSRP request, wherein the header contains the UID. The system then communicates the request and the digital signature to a WSRP producer, thereby allowing a user associated with the UID to sign on without providing a password.

In a variation of this embodiment, generating the WSRP request involves generating a SOAP message. Furthermore, generating the digital signature involves digitally signing a WSS header for the SOAP message.

In a variation of this embodiment, generating the digital signature involves digitally signing the header for the WSRP request with a private key.

In a variation of this embodiment, the system encrypts the WSRP request to facilitate confidential communications with the WSRP producer.

In a variation of this embodiment, generating the WSRP request involves generating a WSS UsernameToken which contains the UID and which does not contain a password for the UID.

In a variation of this embodiment, the system authenticates a user associated with the UID prior to generating the WSRP request.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Overview

Figure 1:
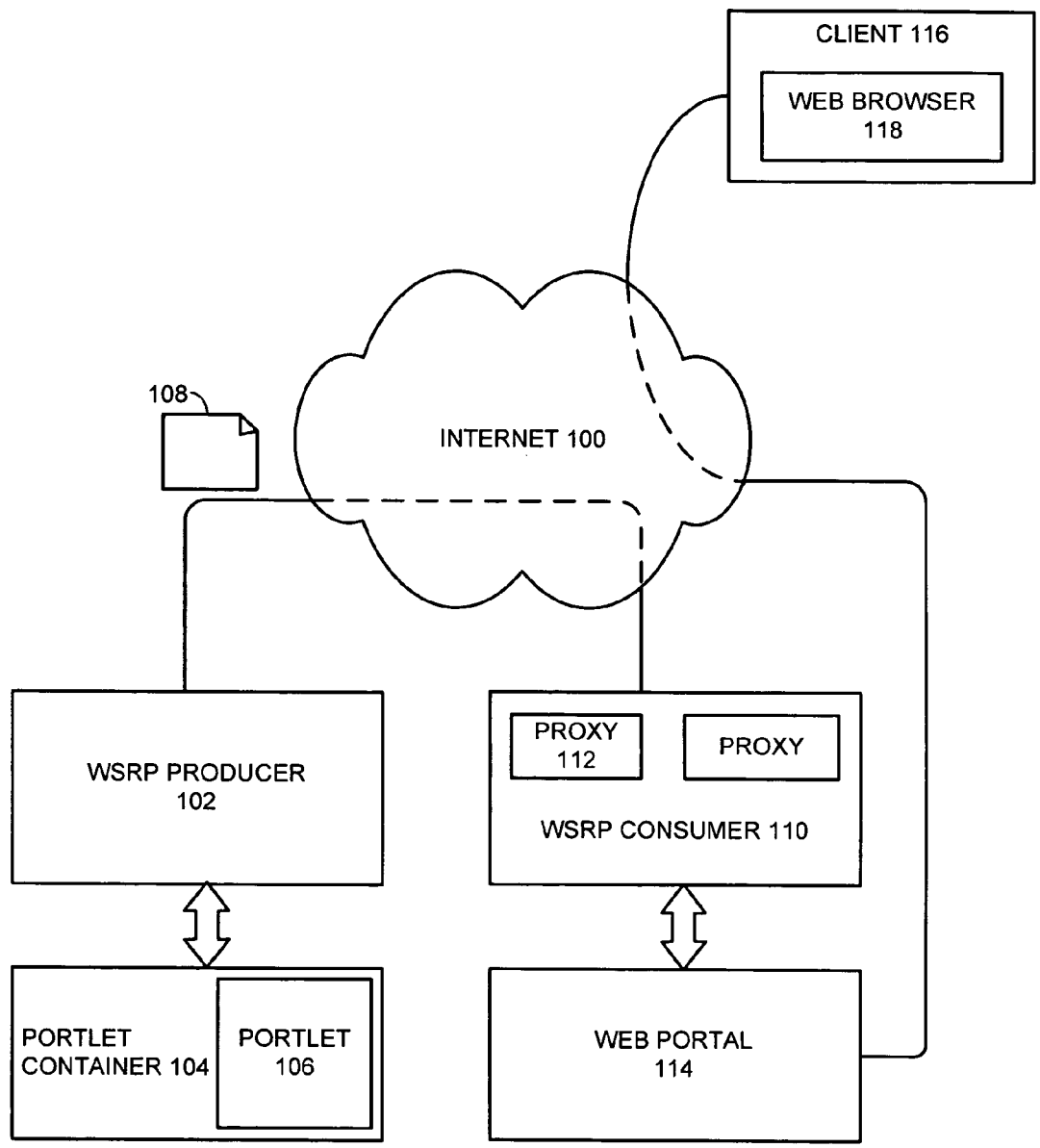
FIG. 1 illustrates an exemplary WSRP architecture that includes a client, a web portal, a WSRP consumer, and a WSRP producer.

FIG. 1 illustrates an exemplary WSRP architecture that includes a client, a web portal, a WSRP consumer, and a WSRP producer. In general, a client 116 uses a web browser 118 to access information presented by a web portal 114 through Internet 100. Web portal 114 assembles and transmits web pages to web browser 118. Using WSRP, web portal 114 can include in its web pages fragments of information from different sources through web services. For example, web portal 114 can provide a user-tailored home page that contains local news, weather information, financial data, and sport events. The user can also configure the web page to retrieve confidential information, such as emails and stock quotes.

Web portal 114 receives different fragments of information through a WSRP consumer 110. Within WSRP consumer 110, a number of proxies, such as proxy 112, communicate with one or more WSRP producers to invoke web services. In this example, proxy 112 is in communication with a WSRP producer 102. WSRP producer 102 obtains the requested services from a portlet container 104, which contains a number of portlets such as portlet 106. Note that a WSRP portlet is a pluggable user interface component that can be accessed through an interface defined by WSRP producer 102. Furthermore, the WSRP requests and the information fragments are typically represented in a mark-up language and encapsulated in SOAP messages such as SOAP message 108.

When a user desires to use SSO to retrieve confidential information from WSRP producer 102, WSRP consumer 110 typically needs to pass the user's identification information onto WSRP producer 102. The present WSS standards allow the use of UsernameToken Profile in conjunction with the X.509 Profile to ensure secure communication. For secure authentication, the user is often required to supply a username and a password. However, the lack of synchronization between the user profiles at WSRP consumer 114 and WSRP producer 102, or the unavailability of password at WSRP consumer 114, can preclude any practical use of SSO.

Secure SSO with Digital Signature

Embodiments of the present invention provide a mechanism that allows secure SSO without requiring the user to provide a password. In one embodiment, the WSRP producer first authenticates the WSRP consumer. When a trusted user requests SSO, the WSRP consumer digitally signs the WSS header of a SOAP request message, which can contain only the username without the password. The WSRP producer then validates the consumer's digital signature to ensure integrity of the SOAP request message. Subsequently, the WSRP producer can authenticate the user based on the username only, so long as the user is trustworthy to the WSRP consumer. In this way, a WSRP producer can easily interoperate with WSRP consumers which belong to different organizations.

Figure 2:
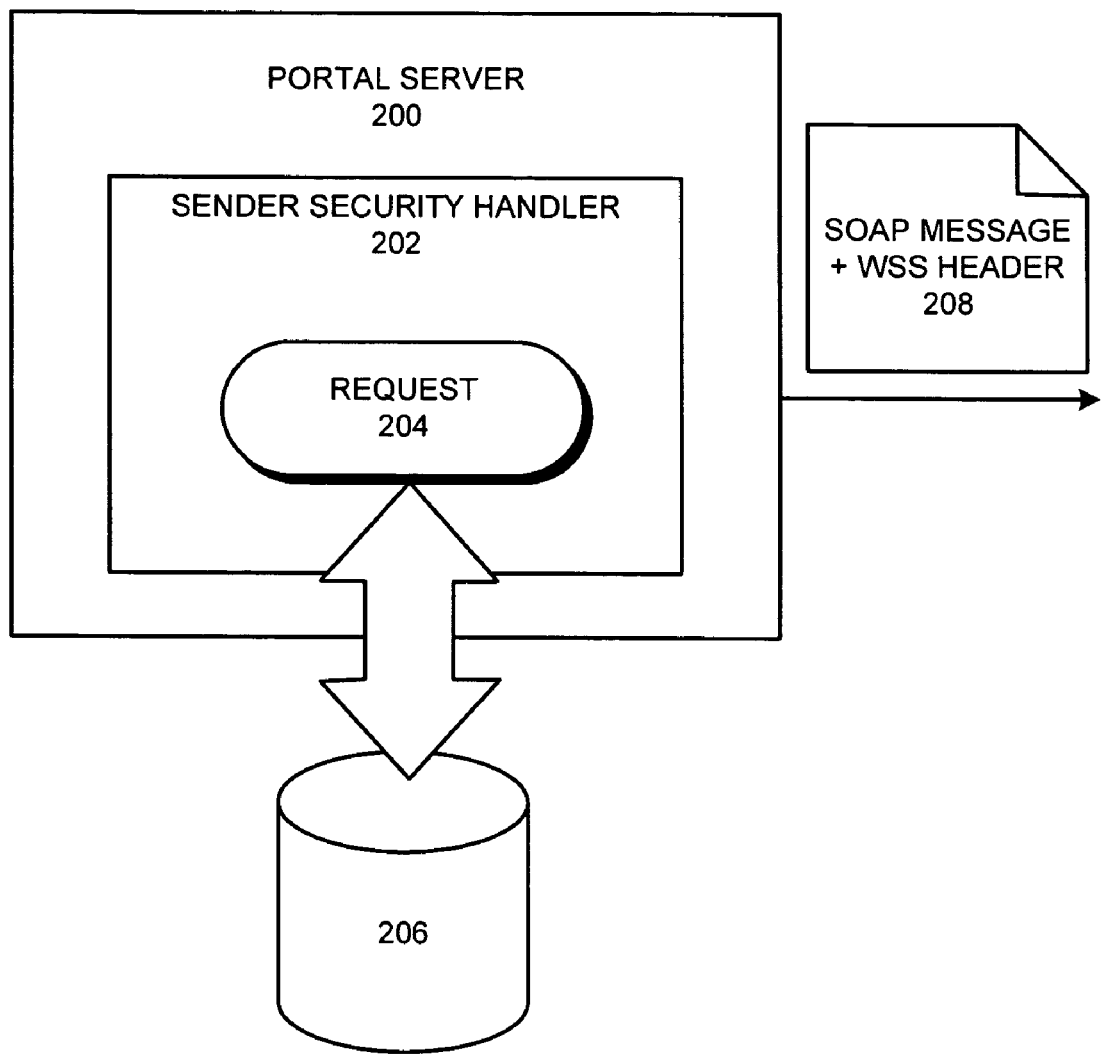
FIG. 2 illustrates an exemplary architecture for a WSRP consumer that facilitates secure SSO without requiring a user to send a password in accordance with an embodiment of the present invention.

FIG. 2 illustrates an exemplary architecture for a WSRP consumer that facilitates secure SSO without requiring a user to send a password in accordance with an embodiment of the present invention. In this example, a portal server 200 functions as a WSRP consumer. Within portal server 200 is a sender security handler 202. Security handler 202 is responsible for authenticating a user and for assembling a corresponding WSRP request that is digitally signed with a private key of portal server 200.

In one embodiment, sender security handler 202 assembles WSRP request 204 based on configuration information retrieved from a data storage 206. In a further embodiment, such configuration information can include deployment description and service-binding information.

To facilitate secure SSO, security handler 202 produces a SOAP meesage 208 based on WSRP request 204. SOAP message 208 includes a WSS header. Additionally, security handler 202 digitally signs the WSS header with a private key and includes the digital signature with SOAP message 208. The distribution of the public key for portal server 200 is assumed to be completed by a public-key infrastructure (PKI).

Note that portal server 200 as a WSRP consumer is assumed to have been previously authenticated by the remote WSRP producer, and hence the digitally signed SOAP message 208, if validated, can be trusted by the WSRP producer. Furthermore, portal server 200 first authenticates the user before producing WSRP request 204 for the user. Hence, if the user is trustworthy to portal server/WSRP consumer 200, and portal server/WSRP consumer 200 is trustworthy to the WSRP producer, and if SOAP message 208 is proven to have maintained its integrity, then the user can also be trustworthy to the WSRP producer. With this security mechanism, a user is not required to submit a password to be authenticated by the WSRP producer.

Figure 3:
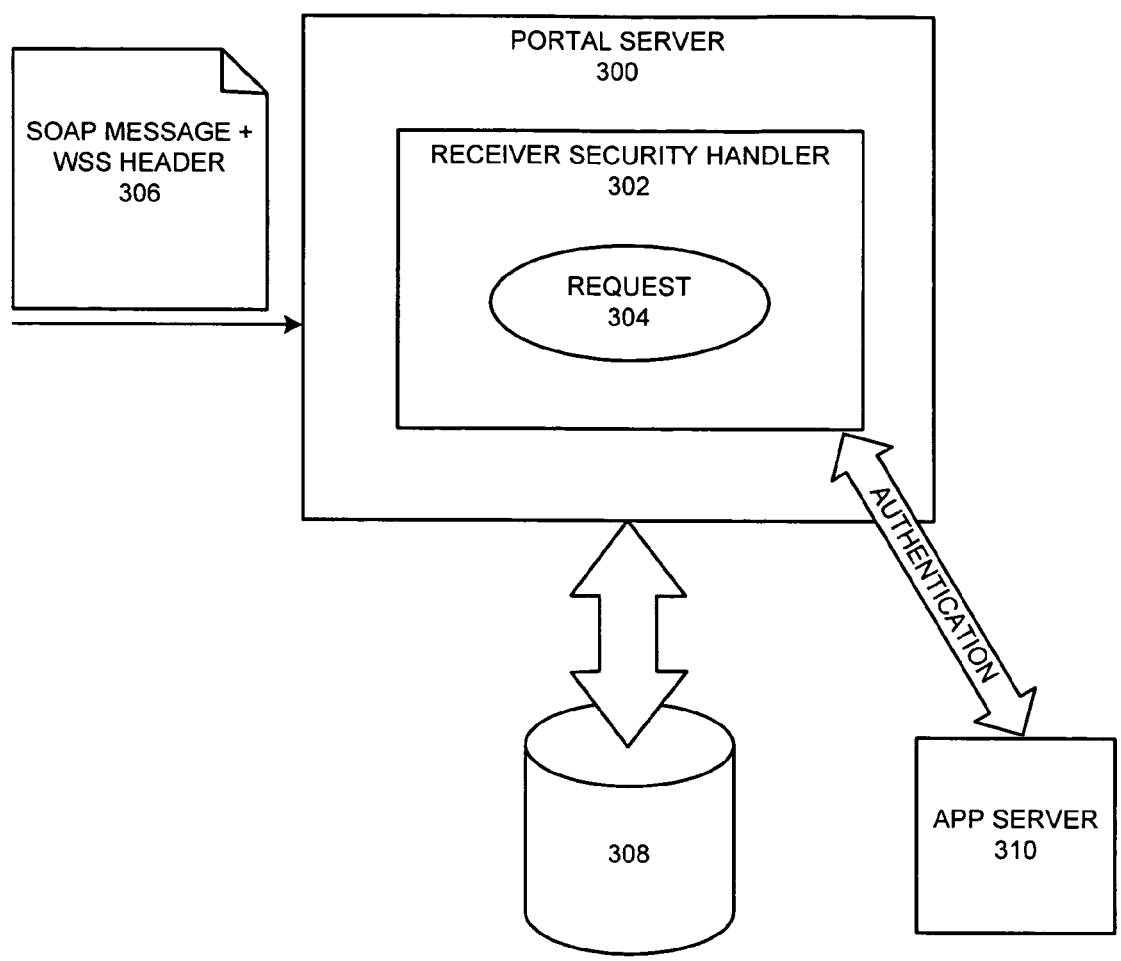
FIG. 3 illustrates an exemplary architecture for a WSRP producer that facilitates secure SSO without requiring a user to send a password in accordance with an embodiment of the present invention.

FIG. 3 illustrates an exemplary architecture for a WSRP producer that facilitates secure SSO without requiring a user to send a password in accordance with an embodiment of the present invention. In this example, portal server 300 functions as a WSRP producer, and receives a SOAP message 306 which includes a WSS header and a corresponding digital signature. A receiver security handler 302 validates the digital signature included with SOAP message 306, using the public key associated with the WSRP consumer. A successful validation of the digital signature indicates that SOAP message 306 has not been tempered with and its content is trustworthy.

Once the digital signature is validated, receiver security handler parses SOAP message 306 and obtains a WSRP request 304 contained therein. In addition, security handler 302 obtains a username contained in a security token as a part of the WSS header for SOAP message 306. In one embodiment, the security token complies with the WSS 1.0 UsernameToken Profile. Security handler 302 further verifies the username to ensure that a user profile corresponding to the username exists. Based on this two-part authentication process, security handler 302 communicates with an application server 310 to obtain a portlet according to WSRP request 304.

In one embodiment, after the SOAP message header is authenticated and the username verified, security handler 302 can further generate an internal security token to gain access to application server 310 or other resources. In a further embodiment, receiver security handler 302 parses SOAP message 306 and obtains WSRP request 304 based on configuration information retrieved from a data storage 308. Such configuration information can include deployment description and service-binding information.

Note that to ensure confidentiality of a SOAP message, a WSRP consumer can encrypt the SOAP message with a public key of the WSRP producer. In this way, the information in the SOAP message body is protected from any potential eavesdropper because only the WSRP producer can decrypt it with its private key. Correspondingly, a WSRP producer first validates the digital signature for the WSS header of a received SOAP message, decrypts the message, and then verifies the username.

Figure 4:
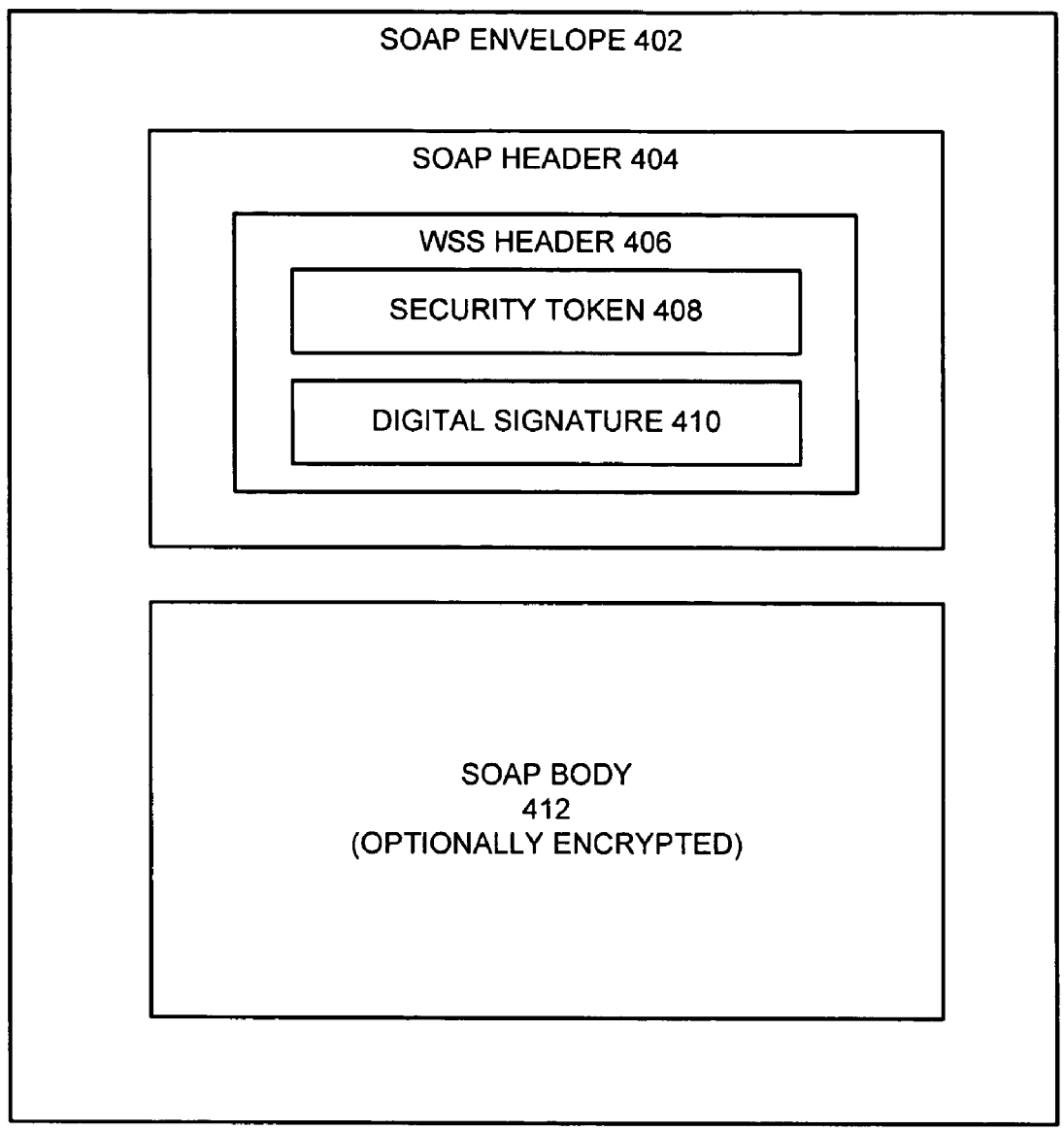
FIG. 4 illustrates an exemplary SOAP message that contains a digital signature of the WSS header in accordance with an embodiment of the present invention.

FIG. 4 illustrates an exemplary SOAP message that contains a digital signature of the WSS header in accordance with an embodiment of the present invention. A SOAP envelope 402 encapsulates a SOAP header 404, which in this case complies with the WSS standards, and a SOAP message body 412, which is optionally encrypted. SOAP header 404 includes a WSS header 406, which further includes a security token 408 and a digital signature 410 associated with WSS header 406.

Figure 5:
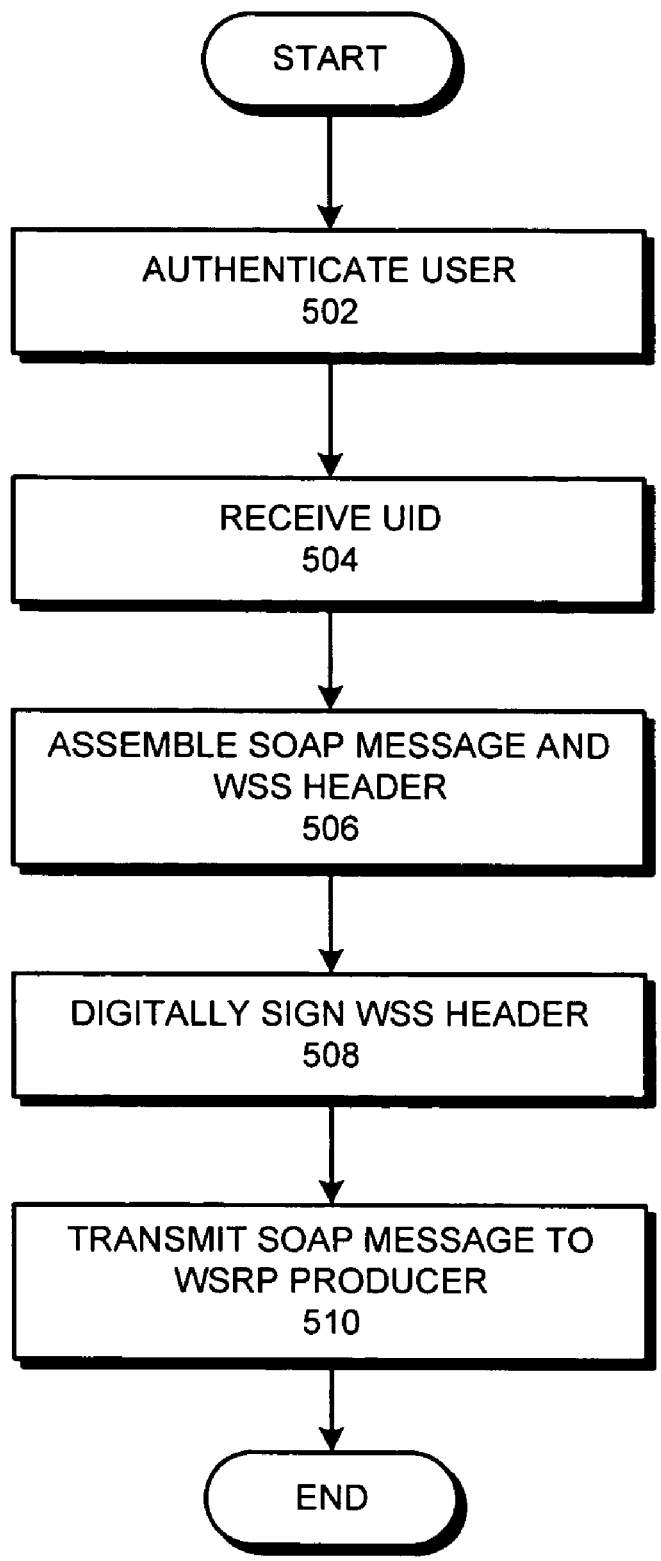
FIG. 5 presents a flow chart illustrating the process of generating a digitally signed SOAP message at a WSRP consumer in accordance with an embodiment of the present invention.

FIG. 5 presents a flow chart illustrating the process of generating a digitally signed SOAP message at a WSRP consumer in accordance with an embodiment of the present invention. During operation, the system at a WSRP consumer first authenticates a user (step 502). Note that this authentication process can be independent from the subsequent WSRP SSO process, and the system can authenticate the user based on a separate username/password pair that is only locally significant to the WSRP consumer.

Next, the system receives the user identification (UID) (step 504) and a corresponding request for WSRP services. The system then assembles a SOAP message which includes a WSS header (step 506). In one embodiment, the WSS header includes a security token which contains the UID. The system further digitally signs the WSS header with a private key (step 508) before transmitting the SOAP message to a WSRP producer (step 510). Optionally, the system can encrypt the SOAP message with the WSRP producer's public key.

Figure 6:
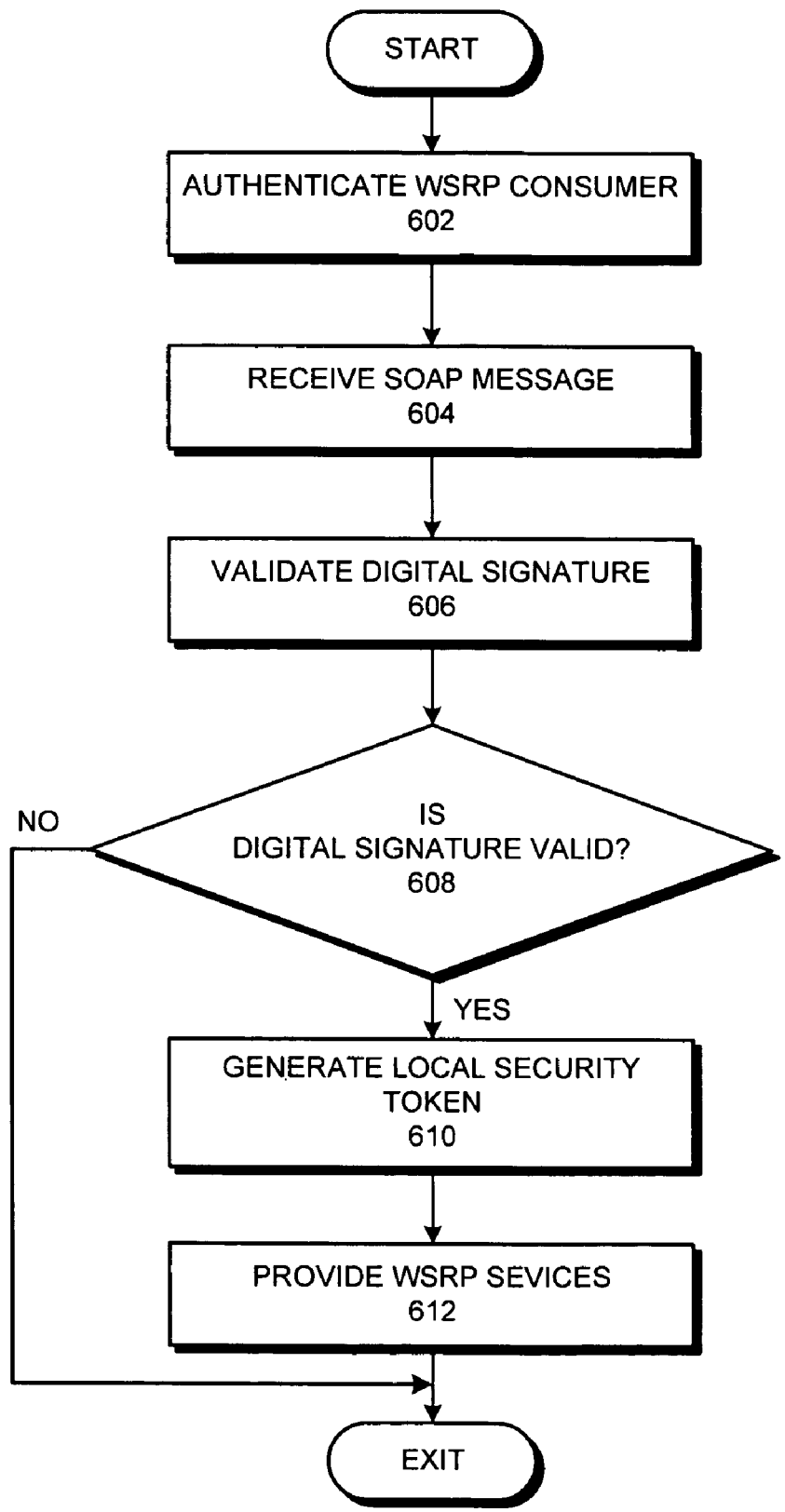
FIG. 6 presents a flow chart illustrating the process of receiving and processing a digitally signed SOAP message at a WSRP producer in accordance with an embodiment of the present invention.

FIG. 6 presents a flow chart illustrating the process of receiving and processing a digitally signed SOAP message at a WSRP producer in accordance with an embodiment of the present invention. During operation, the system at a WSRP producer first authenticates a WSRP consumer (step 602). The system then receives a SOAP message (step 604).

The system then validates the digital signature included with the SOAP message (step 606). Note that if the SOAP message is encrypted with a public key of the WSRP producer, the system decrypts the SOAP message using a private key of the WSRP producer. The system further determines whether the digital signature is valid (step 608), generates a local security token (step 610), and provides the requested WSRP services using the local security token (step 612). If the digital signature is invalid, the system exits.

Figure 7:
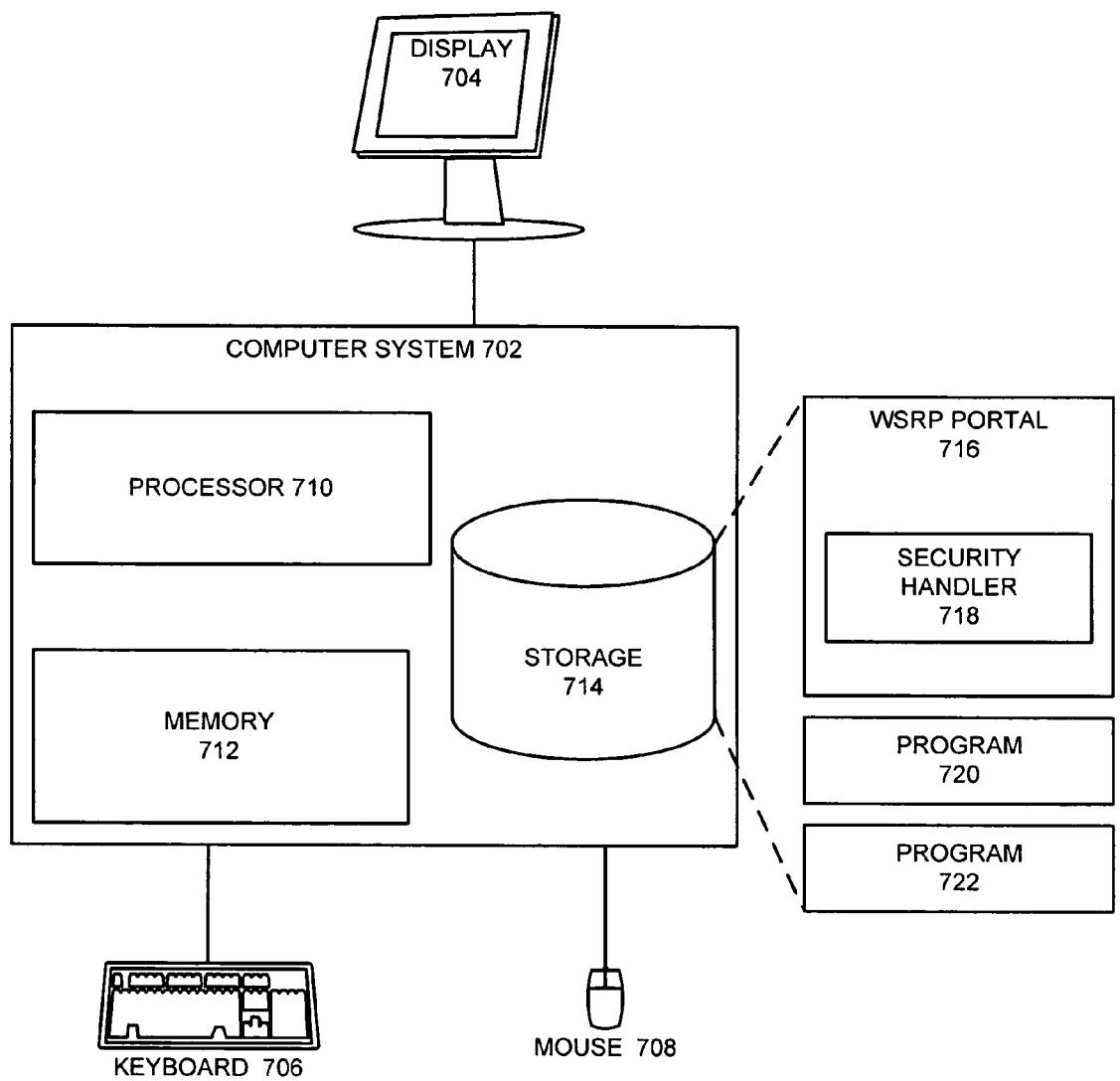
FIG. 7 illustrates an exemplary computer system that facilitates secure WSRP SSO without requiring a user to send a password in accordance with an embodiment of the present invention.

FIG. 7 illustrates an exemplary computer system that facilitates secure WSRP SSO without requiring a user to send a password in accordance with an embodiment of the present invention. A computer system 702 includes a processor 710, a memory 712, and a storage 714. Computer system 702 is also coupled to a display 704, a keyboard 706 and a mouse 708.

Storage 714 stores a number of programs, such as program 720 and program 722. Further stored in storage 714 is a WSRP portal program 716. WSRP portal program functions as a WSRP consumer for requesting WSRP services. In a system that provides WSRP services, WSRP portal program 716 functions as a WSRP producer.

WSRP portal program 716 further includes a security handler 718. If computer system 702 is a WSRP consumer, security handler 718 is responsible for digitally signing and optionally encrypting the SOAP messages. If computer system 702 is a WSRP producer, security handler 718 is responsible for optionally decrypting the SOAP message, validating the digital signature, and verifying the username. Note that embodiments of the present invention can also be implemented on other types of computing and/or communication devices, such as mobile computing devices.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating secure single sign-on (SSO) authentication for web-services communications, the method comprising:
   receiving a Web Services for Remote Portlet (WSRP) request made on behalf of a user from a WSRP consumer;
   retrieving a digital signature included in the WSRP request, wherein the digital signature is generated by digitally signing a Web Services Security (WSS) header, which comprises an identifier associated with the user, using a private key associated with the WSRP consumer such that the user is authenticated without providing a password in the WSS header;
   validating the digital signature; and
   authenticating the user based on the validation.

2. The method of claim 1,
   wherein receiving the WSRP request comprises receiving a Simple Object Access Protocol (SOAP) message; and
   wherein the digital signature is associated with a Web Services Security (WSS) header of the SOAP message.

3. The method of claim 1,
   wherein the digital signature is produced by the WSRP consumer using the private key; and
   wherein validating the digital signature comprises validating the digital signature using a public key corresponding to the private key of the WSRP consumer.

4. The method of claim 1,
   wherein the WSRP request is encrypted; and
   wherein the method further comprises decrypting the WSRP request.

5. The method of claim 1, further comprising generating a local security token based on the authentication of the user, thereby facilitating access to secure local services for the authenticated user.

6. The method of claim 1, further comprising authenticating the WSRP consumer prior to validating the digital signature.

7. A method for facilitating secure single sign-on (SSO) authentication for web-services communications, the method comprising:
   receiving a user identifier (UID) associated with a user;
   generating a Web Services for Remote Portlet (WSRP) request for the UID;
   generating a digital signature by digitally signing a Web Services Security (WSS) header, which comprises the UID, using a private key associated with a WSRP consumer such that the user is authenticated without providing a password in the WSS header; and
   communicating the request comprising the digital signature to a WSRP producer on behalf of the user, thereby allowing the user associated with the UID to sign on without providing a password.

8. The method of claim 7,
   wherein generating the WSRP request comprises generating a SOAP message; and
   wherein generating the digital signature comprises digitally signing a WSS header for the SOAP message.

9. The method of claim 7,
   wherein generating the digital signature comprises digitally signing the header for the WSRP request with the private key.

10. The method of claim 7, further comprising encrypting the WSRP request to facilitate confidential communications with the WSRP producer.

11. The method of claim 7, wherein generating the WSRP request comprises generating a WSS UsernameToken which contains the UID and which does not contain a password for the UID.

12. The method of claim 7, further comprising authenticating the user associated with the UID prior to generating the WSRP request.

13. An apparatus for facilitating secure single sign-on (SSO) authentication for web-services communications, the apparatus comprising:
   a receiving mechanism configured to receive a Web Services for Remote Portlet (WSRP) request made on behalf of a user from a WSRP consumer; and
   a security handling mechanism configured to:
      retrieve a digital signature included in the WSRP request, wherein the digital signature is generated by digitally signing a Web Services Security (WSS) header, which comprises an identifier associated with the user, using a private key associated with the WSRP consumer such that the user is authenticated without providing a password in the WSS header;
      validate the digital signature; and
      authenticate the user based on the validation.

14. The apparatus of claim 13,
   wherein while receiving the WSRP request, the receiving mechanism is configured to receive a SOAP message; and
   wherein the digital signature is associated with a WSS header of the SOAP message.

15. The apparatus of claim 13,
   wherein the digital signature is produced by the WSRP consumer using the private key; and
   wherein while validating the digital signature, the security handling mechanism is configured to use a public key corresponding to the private key of the WSRP consumer.

16. The apparatus of claim 13,
   wherein the WSRP request is encrypted; and
   wherein the apparatus further comprises a decryption mechanism configured to decrypt the WSRP request.

17. The apparatus of claim 13, further comprising a security-token generation mechanism configured to generate a local security token based on the authentication of the user, thereby facilitating access to secure local services for the authenticated user.

18. The apparatus of claim 13, wherein the security handling mechanism is configured to authenticate the WSRP consumer prior to validating the digital signature.

19. An apparatus for facilitating secure single sign-on (SSO) authentication for web-services communications, the apparatus comprising:
   a receiving mechanism configured to receive a user identifier (UID) associated with a user;
   a WSRP-request generation mechanism configured to generate a Web Services for Remote Portlet (WSRP) request corresponding to the UID;
   a security handler configured to generate a digital signature by digitally signing a Web Services Security (WSS) header, which comprises the UID, using a private key associated with a WSRP consumer such that the user is authenticated without providing a password in the WSS header; and
   a transmission mechanism configured to communicate the WSRP request comprising the digital signature to a WSRP producer on behalf of the user, thereby allowing the user associated with the UID to sign on without providing a password.

20. The apparatus of claim 19,
   wherein while generating the WSRP, the WSRP-request generation mechanism is configured to generate a SOAP message; and
   wherein while generating the digital signature, the security handler is configured to digitally sign a WSS header for the SOAP message.

21. The apparatus of claim 19,
   wherein while generating the digital signature, the security handler is configured to digitally sign the header for the WSRP request with the private key.

22. The apparatus of claim 19, further comprising an encryption mechanism configured to encrypt the WSRP request to facilitate confidential communications with the WSRP producer.

23. The apparatus of claim 19, wherein while generating the WSRP request, the WSRP-request generation mechanism is configured to generate a WSS UsernameToken which contains the UID and which does not contain a password for the UID.

24. The apparatus of claim 19, further comprising an authentication mechanism configured to authenticate the user associated with the UID prior to generation of the WSRP request.

* * * * *

UNITED STATES PATENT AND TRADEMARK OFFICE
CERTIFICATE OF CORRECTION

PATENT NO. : 8,001,588 B2  
APPLICATION NO. : 11/638339  
DATED : August 16, 2011  
INVENTOR(S) : Wei et al.

Page 1 of 1

It is certified that error appears in the above-identified patent and that said Letters Patent is hereby corrected as shown below:

On cover page, in column 2, under "Attorney, Agent or Firm", line 1, delete "Vaughn," and insert --Vaughan,--, therefor.

In column 4, line 37, delete "meesage" and insert --message--, therefor.

Signed and Sealed this  
Fifteenth Day of November, 2011

David J. Kappos  
*Director of the United States Patent and Trademark Office*